Aug. 1, 1961 C. M. CARLSON ET AL 2,994,559

WHEEL

Filed Feb. 17, 1959

INVENTORS
CHARLES M. CARLSON
FRED S. POTTER
BY
ATTORNEYS

United States Patent Office 2,994,559
Patented Aug. 1, 1961

2,994,559
WHEEL
Charles M. Carlson and Fred S. Potter, Warsaw, Ind., assignors to Sun Metal Products, Inc., Warsaw, Ind., a corporation of Indiana
Filed Feb. 17, 1959, Ser. No. 793,732
7 Claims. (Cl. 301—2.5)

This invention relates generally to wheels for pedal propelled vehicles, and is concerned more particularly with wheels of the type having a pair of opposed pedal cranks fixed in the hub.

Wheels of this type, which are commonly used as the front wheels of children's tricycles, and the like, are customarily produced by press fitting a straight rod at its center to the hub portion of a wheel, with the ends of the rod projecting from opposite sides of the hub, and thereafter bending the ends of the rod into crank portions to which the pedals are rotatably attached. These operations are often performed by the wheel manufacturer, and the assembled crank-fitted wheels shipped as units to the vehicle manufacturer for attachment to the vehicle.

While the aforementioned mode of manufacture is capable of producing a satisfactory product, it has the disadvantage of requiring complicated and expensive metal forming equipment to assure that the forces applied to the rod in forming the crank arms are not transmitted to the relatively fragile hub, spokes, or rim of the wheel itself. A further disadvantage is that the completed crank-fitted wheel assembly is a cumbersome, unwieldy device which does not lend itself to "stacking" in shipment, so that the shipping cartons therefor are inefficiently used, with a consequent increase in the unit cost of shipping the assemblies.

It is an object of the invention to provide a novel wheel structure employing preformed crank arms which may be simply and quickly secured to the hub portion to yield an assembly wherein the cranks are as rigidly held relatively to the hub as if they were integral with the axle.

A further object is to provide a wheel having a hollow axle of non-circular cross-section and separate crank members having arms of similar cross-section disposed in the axle, the axle and crank arms having cooperating positioning and locking members whereby the crank arms are rigidly held in the axle and restrained against relative axial and rotational movement with respect to the axle.

Other and ancillary objects and advantages of the invention will in part be obvious and will in part appear in the following description of a preferred embodiment of the invention wherein reference is made to the accompanying drawings in which.

Figure 1:
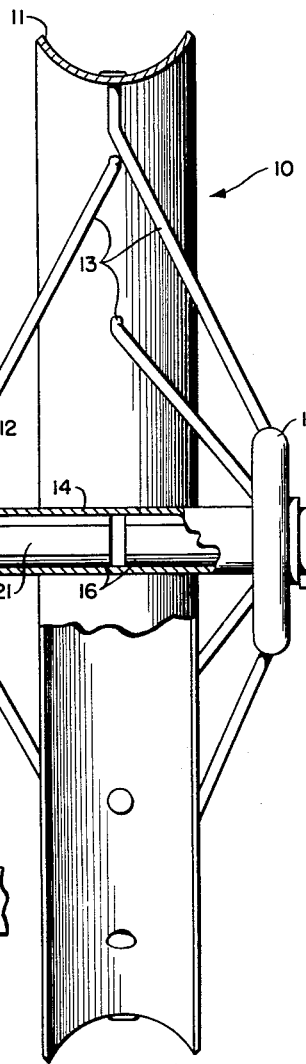
FIGURE 1 is a side elevational view, partly in section, illustrating the assembled crank-fitted wheel assembly of the invention.

Referring now particularly to FIGURE 1, there is shown a wheel member 10 having a rim 11, hub portions 12, and spokes 13 connecting the hub portions and the rim in conventional manner. A hollow axle 14 preferably of non-circular or substantially polygonal cross-section is press fitted concentrically in the hub portions 12, and an arm 16 of a crank 17 extends into the axle from each end thereof, as shown. It will be seen by inspection of FIGURE 1 that the hub, axle, and crank assemblies, and the parts appurtenant thereto, are duplicated on both sides of the wheel, and therefore, only one side thereof will be described.

Figure 3:
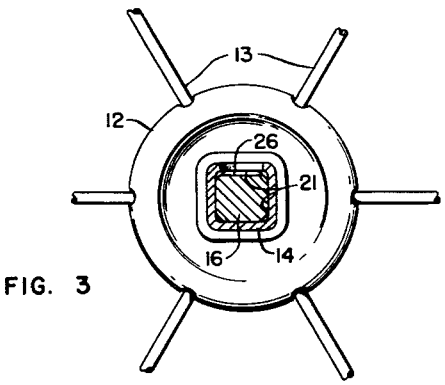
FIGURE 3 is a cross-sectional view, taken on line 3—3 of FIGURE 1, looking in the direction of the arrows.

The axle 14 is preferably fabricated of sheet metal, such as sheet steel, and is preferably substantially square in cross-section with its corners somewhat rounded, as shown in FIGURE 3. The axle projects outwardly from the hub portion 12 and carries at its outer end a bearing 18 press fitted on the axle, the bore of the inner race of the bearing conforming to the corner radii of the section of the axle 14. The bearing 18 is adapted to be secured in the end of a fork member 19 constituting part of the steering mechanism (not shown) of the vehicle.

The portion of the arm 16 enclosed by the axle preferably has generally the same cross-sectional configuration as the interior of the axle, whereby relative rotation between these parts is restrained, and the arm 16 is adapted to be slidably received within the axle. Broadly speaking, prevention of relative rotation between the axle 14 and arm 16 may be effected by providing the arm 16 with a plane portion which is adapted to cooperate with locking means on the axle which will be more fully described hereinafter. In the form illustrated in FIGURE 1, the crank 17 is fabricated from round metal stock, and the arm 16 is machined over a portion of its length to provide flats 21 thereon (FIGURE 3) whereby the arm 16 is made to conform generally to the interior of the axle.

Figure 2:
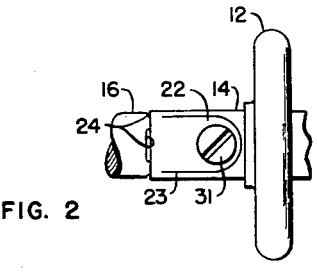
FIGURE 2 is a top plan view of a portion of the assembly, illustrating locking means for holding the crank member thereof rigid with the axle portion of the wheel.

The axle 14 is provided adjacent its outer end with an inwardly directed tongue or flap 22 formed by cutting through one face or surface of the axle along a substantially U-shaped line, shown as 23 in FIGURE 2, and the arm 16 is provided with inwardly facing shoulders 24 which may conveniently coincide with the outer ends of the flats 21, and which are adapted to abut the outer end of the axle to limit inward axial movement of the arm 16 in the axle.

Figure 4:
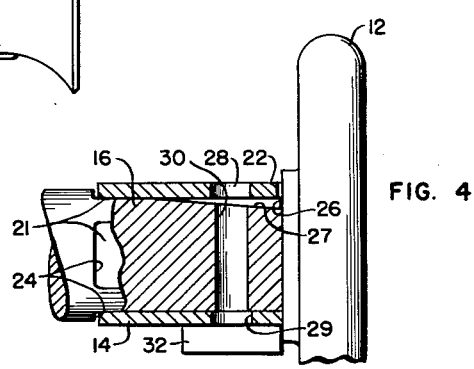
FIGURE 4 is an enlarged sectional view showing the cooperating parts on the crank and axle members of the wheel assembly for restraining relative axial and longitudinal movement between said members.

Positioned on the arm 16 between the free end thereof and the shoulders 24 is an outwardly facing shoulder 26 (FIGURE 4), the latter being conveniently formed by making a short, inclined, transverse cut in the surface of the arm by any suitable means, as by grinding or machining. In the cutting operation for forming the shoulder 26 a short, depressed plane area 27 is formed on the arm 16, which terminates at the base of the shoulder 26. The shoulder 26 is so positioned on the arm 16 that it will lie directly beneath the free end of the tongue 22 when the arm 16 is inserted the maximum distance into the axle 14, as determined by the shoulders 24.

The tongue 22 and the opposite wall of the axle 14 are drilled to form aligned apertures 28, 29, and the arm 16 is likewise drilled transversely to form an aperture 30 which is adapted to become aligned with the apertures 28, 29 when the arm 16 is inserted in the axle with its shoulders 24 abutting the end of the axle. A bolt 31 passes through the apertures 28, 29, 30 and engages a nut 32, whereby the tongue 22 may be tightly held against the plane area 27, with the free end of the tongue abutting the shoulder 26. For convenience in assembling the wheel structure, the nut 32 may be welded in position adjacent the aperture 29.

It will be seen, then, that with the several parts assembled as described above, and with the bolt 31 tightened in its nut 32, the tongue 22, being thereby held tightly against the plane area 27, prevents the arm 16 from rotating relative to the axle. The non-circular configuration of the arm 16 within the axle of similar interior configuration, assists in preventing relative rotational movement between these parts. The free end of the tongue abutting against the shoulder 26 on the arm 16, restrains the latter against relative axial movement outwardly of the axle, and the shoulders 24 abutting against the outer end of the axle restrains the arm 16 against relative axial movement inwardly of the axle.

With the construction described above, it will be seen that the crank portions may be easily and inexpensively fabricated as separate components on simple machines, and the finished cranks and wheels shipped in disassembled condition in ordinary cartons, using much less shipping space, i.e., smaller cartons, than would be required to send an equal number of crank-fitted wheels wherein the cranks are fabricated from a single rod member and formed after the rod stock has been fixed to the wheel hub, in accordance with common practice.

We claim:

1. In combination, a wheel including a hub, a hollow axle fixed concentrically in said hub and projecting outwardly therefrom, said axle being of non-circular cross-section and having formed in the wall thereof a tongue directed inwardly from the end of said axle, said tongue being located outwardly of said hub, a crank member, one arm of said crank member having a cross-section corresponding to that of said axle, said arm being enclosed in said axle with the corresponding surfaces of said arm and said axle in contiguous relation, an inwardly facing shoulder on said arm abutting the outer end of said axle to limit inward axial movement of said arm relative to said axle, an outwardly facing shoulder on said arm positioned between said first mentioned shoulder and the enclosed end of said arm, said second-mentioned shoulder being aligned with the free end of said tongue, and means for holding said tongue unyieldingly against said crank arm with the free end of said tongue abutting said second-mentioned shoulder, whereby said crank arm is restrained against relative axial and rotational movement with respect to said axle.

2. In combination, a wheel including a hub, a hollow substantially polygonal axle having a sheet metal wall fixed concentrically in said hub and projecting outwardly therefrom, one of the faces of said axle having a tongue cut therein adjacent its outer end and directed inwardly from said end of said axle, said tongue being located outwardly of said hub, a crank member, one of said crank members having a cross-section corresponding to that of said axle, said arm being enclosed in said axle with the corresponding surfaces of said arm and said axle in contiguous relation, said enclosed arm having a plane portion positioned adjacent said tongue, an inwardly facing shoulder on said arm abutting the outer end of said axle to limit inward axial movement of said arm relative to said axle, an outwardly facing shoulder on said arm positioned between said first-mentioned shoulder and the enclosed end of said arm, said second-mentioned shoulder being aligned with the free end of said tongue, said plane portion terminating at the base of said second-mentioned shoulder, and means for holding said tongue unyieldingly against said plane portion on the crank arm with the free end of said tongue abutting said second-mentioned shoulder, whereby said crank arm is restrained against relative axial and rotational movement with respect to said axle.

3. In combination, a wheel including a hub, a hollow axle fixed concentrically in said hub and projecting outwardly therefrom, said axle being substantially square in cross-section and having formed in a face thereof, adjacent its outer end, a tongue directed inwardly from said end of said axle, said tongue being located outwardly of said hub, a crank member, one arm of said crank member having a square cross-section and being enclosed in said axle with the corresponding surfaces of said arm and said axle in contiguous relation, an inwardly facing shoulder on said arm abutting the outer end of said axle to limit inward axial movement of said arm relative to said axle, an outwardly facing shoulder on said arm positioned between said first-mentioned shoulder and the enclosed end of said arm, said second-mentioned shoulder being aligned with the free end of said tongue, said enclosed arm having a plane portion terminating at the base of said second-mentioned shoulder, said axle having aligned transverse apertures through said tongue and through its wall opposite said tongue, said arm having a transverse aperture aligned with said first-mentioned apertures in said axle, and bolt means extending through said aligned apertures for holding said tongue unyieldingly against said plane portion with the free end of said tongue abutting said second-mentioned shoulder, whereby said crank arm is restrained against axial and rotational movement relative to said axle.

4. In combination, a wheel including a hub, a hollow axle fixed concentrically in said hub and projecting outwardly therefrom, said axle having formed in the wall thereof a tongue directed inwardly from the end of said axle, said tongue being located outwardly of said hub, a crank member, one arm of said crank member being enclosed in said axle, an inwardly facing shoulder on said arm abutting the outer end of said axle to limit inward axial movement of said arm relative to said axle, an outwardly facing shoulder on said arm positioned between said first-mentioned shoulder and the enclosed end of said arm, said second-mentioned shoulder being aligned with the free end of said tongue, and means for holding said tongue unyieldingly against said crank arm with the free end of said tongue abutting said second-mentioned shoulder, whereby said crank arm is restrained against relative axial and rotational movement with respect to said axle.

5. In combination, a wheel including a hub, a hollow axle fixed concentrically in said hub and projecting outwardly therefrom, an antifriction bearing fixed on the end of said axle, said axle being of non-circular cross-section, a crank member, one arm of said crank member having a cross-section corresponding to that of said axle, said arm being enclosed in said axle with the corresponding surfaces of said arm and said axle in contiguous relation, and locking means for securing said arm of said crank member within said axle, said locking means comprising a tongue formed in the wall of said axle and directed inwardly from the end of said axle, an inwardly facing shoulder on said arm abutting the outer end of said axle to limit inward axial movement of said arm relative to said axle, an outwardly facing shoulder on said arm positioned between said first-mentioned shoulder and the enclosed end of said arm, said second-mentioned shoulder being aligned with the free end of said tongue, and retaining means for holding said tongue unyieldingly against said crank arm with the free end of said tongue abutting said second-mentioned shoulder, said locking means being located between said hub and said bearing.

6. The combination in accordance with claim 5, wherein said axle has aligned transverse apertures through said tongue and through the wall of said axle opposite said tongue, said arm has a transverse aperture aligned with the apertures in said axle, and said retaining means comprises a nut integral with said axle on the said wall opposite said tongue and aligned with said apertures, and a bolt extending through said aligned apertures and threaded in said nut, said bolt holding said tongue unyieldingly against said crank arm.

7. In combination, a wheel including a hub, a hollow axle fixed concentrically in said hub and projecting outwardly therefrom, said axle having formed in the wall thereof a tongue directed inwardly from the end of said axle, said tongue being located outwardly of said hub, an antifriction bearing fixed on the end of said axle, a crank member, one arm of said crank member being enclosed in said axle, an inwardly facing shoulder on said arm abutting the outer end of said axle to limit inward axial movement of said arm relative to said axle, an outwardly facing shoulder on said arm positioned between said first-mentioned shoulder and the enclosed end of said arm, said second-mentioned shoulder being aligned with the free end of said tongue, said enclosed arm having a plane portion terminating at the base of said second-mentioned shoulder, said axle having aligned transverse apertures through said tongue and through the wall of said axle opposite said tongue, said arm having a transverse aperture aligned with the apertures in said axle, a nut integral with said axle on the said wall thereof opposite said tongue and aligned with said apertures, and a bolt extending through said aligned apertures and threaded in said nut, said bolt holding said tongue unyieldingly against said plane portion with the free end of said tongue abutting said second-mentioned shoulder and being located between said hub and said bearing.

References Cited in the file of this patent

UNITED STATES PATENTS

| | | |
|---|---|---|
| 1,411,852 | Ledig | Apr. 4, 1922 |
| 1,599,702 | Ferris | Sept. 14, 1926 |
| 2,240,330 | Flagg | Apr. 29, 1941 |

UNITED STATES PATENT OFFICE

CERTIFICATE OF CORRECTION

Patent No. 2,994,559

August 1, 1960

Charles M. Carlson et al.

It is hereby certified that error appears in the above numbered patent requiring correction and that the said Letters Patent should read as corrected below.

Column 3, line 41, after "one" insert -- arm --; line 42, for "members" read -- member --.

Signed and sealed this 12th day of December 1961.

(SEAL)
Attest:

ERNEST W. SWIDER
Attesting Officer

DAVID L. LADD
Commissioner of Patents

USCOMM-DC